United States Patent
Li et al.

(10) Patent No.: US 9,840,416 B2
(45) Date of Patent: Dec. 12, 2017

(54) METHOD FOR SYNTHESIZING NANO-LITHIUM IRON PHOSPHATE WITHOUT WATER OF CRYSTALLIZATION IN AQUEOUS PHASE AT NORMAL PRESSURE

(71) Applicant: GENERAL LITHIUM CORPORATION, Haimen, Jiangsu (CN)

(72) Inventors: Nanping Li, Haimen (CN); Guoduan He, Haimen (CN); Qin Zhang, Haimen (CN); Yanfeng Jiang, Haimen (CN)

(73) Assignee: General Lithium Corporation (CN)

( * ) Notice: Subject to any disclaimer, the term of this patent is extended or adjusted under 35 U.S.C. 154(b) by 183 days.

(21) Appl. No.: 14/898,207

(22) PCT Filed: Mar. 5, 2014

(86) PCT No.: PCT/CN2014/000199
§ 371 (c)(1),
(2) Date: Dec. 14, 2015

(87) PCT Pub. No.: WO2015/014090
PCT Pub. Date: Feb. 5, 2015

(65) Prior Publication Data
US 2016/0145103 A1    May 26, 2016

(30) Foreign Application Priority Data

Jul. 29, 2013 (CN) .......................... 2013 1 0320379

(51) Int. Cl.
| | | |
|---|---|---|
| C01B 25/45 | (2006.01) | |
| H01M 4/58 | (2010.01) | |
| H01M 4/525 | (2010.01) | |
| H01M 10/0525 | (2010.01) | |

(52) U.S. Cl.
CPC ............. C01B 25/45 (2013.01); H01M 4/525 (2013.01); H01M 4/5825 (2013.01); H01M 10/0525 (2013.01)

(58) Field of Classification Search
CPC ...................................................... C01B 25/45
USPC .......................................................... 423/306
See application file for complete search history.

(56) References Cited

U.S. PATENT DOCUMENTS

| | | | |
|---|---|---|---|
| 2008/0241690 A1* | 10/2008 | Delacourt | ............... C01B 25/37 429/221 |
| 2009/0035204 A1* | 2/2009 | Xu | .......................... C01B 25/45 423/311 |
| 2012/0058039 A1* | 3/2012 | Huang | ................... B82Y 30/00 423/306 |

FOREIGN PATENT DOCUMENTS

| | | |
|---|---|---|
| CN | 102842716 A | 12/2012 |
| CN | 103400983 A | 11/2013 |
| JP | 2011175767 A | 9/2011 |

OTHER PUBLICATIONS

International Search Report and Written Opinion issued in corresponding International Application No. PCT/CN2014/000199.

* cited by examiner

*Primary Examiner* — Ngoc-Yen Nguyen
(74) *Attorney, Agent, or Firm* — Leason Ellis LLP

(57) ABSTRACT

A method for synthesizing nano-lithium iron phosphate without water of crystallization in aqueous phase at normal pressure, which is part of a preparation method for a lithium ion positive electrode material. The preparation process comprises the following steps: preparing lithium phosphate, preparing an aqueous phase suspension of lithium phosphate, preparing a ferrous salt solution, preparing nano-lithium iron phosphate without water of crystallization, and recovering and recycling lithium in a mother solution of lithium iron phosphate. The present invention has the beneficial effects of mild reaction conditions, a short time, low energy consumption, reduced costs due to the recovery and recycling of lithium in the mother solution, stable batches, uniform and controllable strength, and being conducive to industrial production.

4 Claims, 1 Drawing Sheet

METHOD FOR SYNTHESIZING NANO-LITHIUM IRON PHOSPHATE WITHOUT WATER OF CRYSTALLIZATION IN AQUEOUS PHASE AT NORMAL PRESSURE

BACKGROUND OF THE INVENTION

Field of the Invention

The present invention relates to a method for preparing a positive electrode material for lithium ion batteries, and in particular, a method for preparing nano-lithium iron phosphate without water of crystallization in aqueous phase at normal pressure.

Description of Related Art

Lithium iron phosphate is a positive electrode material for lithium ion batteries, and lithium iron phosphate ($LiFePO_4$) crystals having an olivine structure have the advantages of reduced cost, less contamination, higher capacity, stable structure during the charge-discharge process, smaller capacity fade, and higher security, compared to other positive electrode materials for lithium ion batteries. Thus, since from 1997 at which it was found by Goodenough et al. to have lithium intercalation/deintercalation property, lithium iron phosphate has been considered to be one of desirable positive electrode materials for lithium ion batteries.

Methods for synthesizing lithium iron phosphate mainly include high temperature solid-state method, hydrothermal method, solvothermal method, solution co-precipitation method, sol-gel method etc. The solid-state method has a main problem of poor stability of product batches, directly leading to adverse reactions of groups of cells. Precursors obtained from the solution co-precipitation method and the sol-gel method are not lithium iron phosphate, but are a mixture of multiple materials, it is very difficult to achieve the consistent composition of the mixture, and lithium iron phosphate crystals cannot be obtained unless the precursors generated are again subjected to high temperature calcinations, which leads to extended production process and poor product consistency and high equipment investment. Although lithium iron phosphate crystals can be directly obtained by the hydrothermal method and the solvothermal method, a high pressure and high temperature reaction apparatus is needed, which leads to huge investment and thus is unsuitable for large-scale industrial production.

In view of the shortcomings in the prior art above, the present invention provides a method for directly synthesizing nano-lithium iron phosphate without water of crystallization in aqueous phase at normal pressure.

SUMMARY OF THE INVENTION

According to the present invention, a commercially available lithium source is firstly converted into lithium phosphate and then introduced into an aqueous phase as a lithium and phosphorus source for synthesizing lithium iron phosphate at normal pressure. A process for synthesizing nano-lithium iron phosphate without water of crystallization in aqueous phase at normal pressure specifically comprises:

a. preparing lithium phosphate: phosphoric acid is added in an aqueous solution of a lithium salt having a lithium content of 0.2-4 mol/L and heated to 30-80° C., with the molar amount of phosphoric acid added being 1/3 of that of lithium in the solution, and then adjusted to a pH of 9-11 by adding an aqueous sodium hydroxide solution while stirring, and further subjected to solid-liquid separation and washing, giving lithium phosphate as solid;

b. preparing an aqueous phase suspension of lithium phosphate: the resulting lithium phosphate is dispersed in water into a suspension of lithium phosphate having a lithium phosphate concentration of 0.1-1 mol/L;

c. preparing a ferrous salt solution: a ferrous salt is dissolved into water to prepare a ferrous salt solution having an iron content of 0.5-3 mol/L, and adjusted to a pH of 1-3 with an acid;

d. preparing nano-lithium iron phosphate without water of crystallization: the suspension of lithium phosphate prepared in b is placed in a reactor and heated to boiling at normal pressure while stirring, vaporized steam is cooled and refluxed and under reflux, the ferrous salt solution prepared in c is slowly added, with the molar amount of the ferrous salt added being 0.97-1.0 time of that of lithium phosphate in the reactor and the addition time being controlled to be within 1-3 h, and after the addition, the reaction is continued under reflux with stirring for 2-8 h and then subjected to solid-liquid separation, washing and drying, giving nano-lithium iron phosphate without water of crystallization as solid and a corresponding mother solution of lithium iron phosphate;

e. recovering and recycling lithium in a mother solution of lithium iron phosphate: the remaining mother solution of lithium iron phosphate after separating nano-lithium iron phosphate without water of crystallization as solid prepared in the previous step is transferred into a reactor, phosphoric acid is added while stirring, with the molar amount of phosphoric acid added being 1/3 of that of lithium in the mother solution, and then heated to 30-80° C., and adjusted to a pH of 9-11 by adding a sodium hydroxide solution, and further subjected to solid-liquid separation and washing, giving lithium phosphate, which is recycled back to the step b.

The lithium salt in the step a is any one of lithium sulfate, lithium carbonate, lithium chloride, lithium hydroxide, lithium nitrate, lithium acetate and lithium citrate, or a mixture thereof in any ratio.

The ferrous salt in the step c is any one of ferrous sulfate, ferrous chloride, ferrous nitrate and ferrous acetate, or a mixture thereof in any ratio, and the acid used to adjust the pH of the solution is any one of sulfuric acid, hydrochloric acid, nitric acid, acetic acid and citric acid, or a mixture thereof in any ratio.

The solid-liquid separation and washing in the step d may be any one of suction filtration, press filtration and centrifugation, and the drying may be any one of spray drying and oven drying, where the temperature for spray drying is 120-320° C., and the temperature for oven drying is 40-200° C. and the duration for oven drying is 0.5-48 h.

The present invention has the beneficial effects of mild reaction conditions, a short time, low energy consumption, reduced costs due to the recovery and recycling of lithium in the mother solution, good product performance, stable batches, uniform and controllable strength, and being conducive to industrial production.

DETAILED DESCRIPTION OF THE INVENTION

Figure 1:
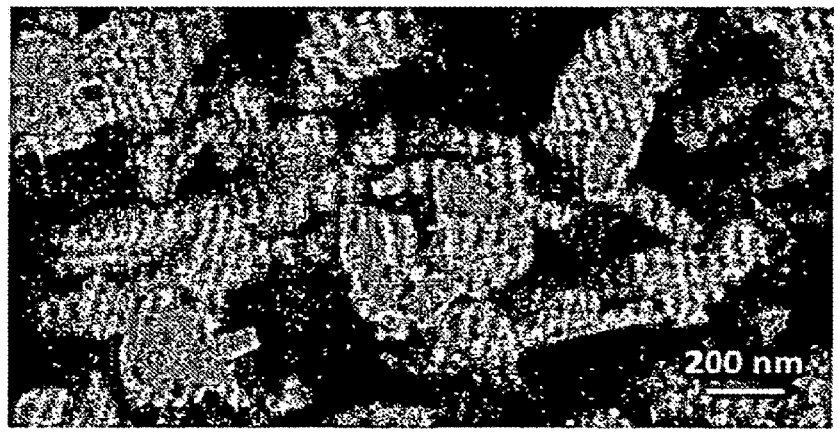
FIG. 1 is an SEM image of nano-lithium iron phosphate without water of crystallization directly synthesized in aqueous phase at normal pressure.
Figure 2:
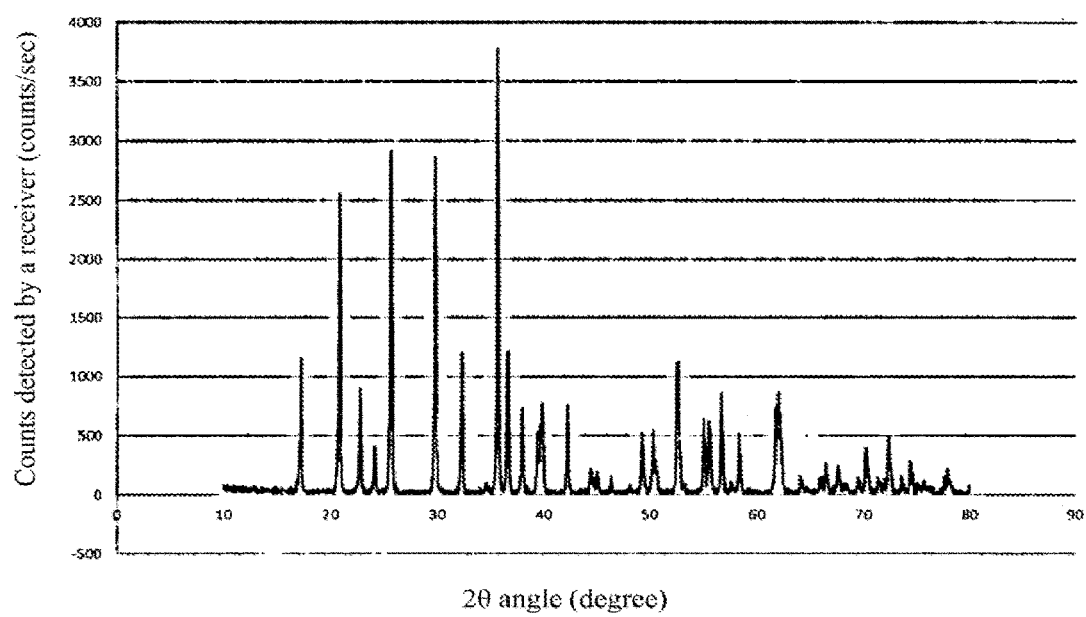
FIG. 2 is an X-ray diffraction pattern of nano-lithium iron phosphate without water of crystallization directly synthesized in aqueous phase at normal pressure.

Embodiments of the present invention are further described below.

Example 1

4800 L of a lithium sulfate solution having a lithium content of 0.2 mol/L was added in a 6300 L enamel reactor, the agitation was started, 36.9 kg of 85% phosphoric acid was added and heated to 80° C., and then an aqueous sodium hydroxide solution was added to the reactor to adjust the pH value to 11, and finally was subjected to solid-liquid separation and washing, giving lithium phosphate as solid.

The resulting lithium phosphate was dispersed in water, to prepare a suspension of lithium phosphate having a concentration of 0.1 mol/L. Meanwhile, 582 L of a ferrous sulfate solution having an iron content of 0.5 mol/L was prepared, and adjusted to pH 1 with sulfuric acid. 3000 L of the previously obtained 0.1 mol/L suspension of lithium phosphate was added into a 5000 L reactor equipped with a reflux apparatus, the agitation was started, the suspension of lithium phosphate was heated to reflux, and 582 L of the ferrous sulfate solution having an iron content of 0.5 mol/L prepared above was slowly added under reflux with the addition time being controlled to be about 1 h, and after the addition of the ferrous sulfate solution was completed, the reaction was continued under reflux with stirring for 8 h, and then subjected to solid-liquid separation, washing and drying, giving nano-lithium iron phosphate without water of crystallization as solid and a corresponding mother solution of lithium iron phosphate.

The mother solution of lithium iron phosphate was transferred to a 5000 L reactor for lithium recovery, 23 kg of 85% phosphoric acid was added with stirring and heated to 80° C., and then a sodium hydroxide solution was added to adjust the pH value to 11, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 400 nm.

Example 2

4800 L of a lithium hydroxide solution having a lithium content of 0.4 mol/L was added in a 6300 L enamel reactor, the agitation was started, 73.8 kg of 85% phosphoric acid was added and heated to 70° C., and then an aqueous sodium hydroxide solution was added to the reactor to adjust the pH value to 11, and finally was subjected to solid-liquid separation and washing, giving lithium phosphate as solid.

The resulting lithium phosphate was dispersed in water, to prepare a suspension of lithium phosphate having a concentration of 0.2 mol/L. 582 L of a mixed solution of ferrous acetate and ferrous chloride having an iron content of 1 mol/L was prepared from adequate amounts of ferrous acetate and ferrous chloride, and adjusted to pH 1 with nitric acid. 3000 L of the previously prepared 0.2 mol/L suspension of lithium phosphate was added into a 5000 L reactor equipped with a reflux apparatus, the agitation was started, the suspension of lithium phosphate was heated to reflux, and 582 L of the 1 mol/L mixed solution of ferrous acetate and ferrous chloride prepared above was slowly added under reflux with the addition time being controlled to be about 1 h, and then the reaction was continued under reflux with stirring for 7 h, and then subjected to solid-liquid separation, washing and drying, giving nano-lithium iron phosphate without water of crystallization as solid and a corresponding mother solution of lithium iron phosphate.

The resulting mother solution of lithium iron phosphate was transferred to a 5000 L reactor for lithium recovery, 46 kg of 85% phosphoric acid was added with stirring and heated to 70° C., and then a sodium hydroxide solution was added to adjust the pH value to 11, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 320 nm.

Example 3

3000 L of a lithium chloride solution having a lithium content of 4 mol/L was added in a 5000 L enamel reactor, the agitation was started, 461 kg of 85% phosphoric acid was added and heated to 20° C., and then an aqueous sodium hydroxide solution was added to the reactor to adjust the pH value to 9, and finally was subjected to solid-liquid separation and washing, giving lithium phosphate as solid.

The resulting lithium phosphate was dispersed in water, to prepare a suspension of lithium phosphate having a concentration of 1.0 mol/L. 1000 L of a ferrous chloride having an iron content of 3 mol/L was prepared from an adequate amount of ferrous chloride, and adjusted to pH 3 with hydrochloric acid. 3000 L of the previously prepared 1.0 mol/L suspension of lithium phosphate was added into a 5000 L reactor equipped with a reflux apparatus, the agitation was started, the suspension of lithium phosphate was heated to reflux, and 1000 L of the 3 mol/L ferrous chloride solution prepared above was slowly added under reflux with the addition time being controlled to be about 3 h, and then the reaction was continued under reflux with stirring for 2 h, and then subjected to solid-liquid separation, washing and drying, giving nano-lithium iron phosphate without water of crystallization as solid and a corresponding mother solution of lithium iron phosphate.

The resulting mother solution of lithium iron phosphate was transferred to a 5000 L reactor for lithium recovery, 230.6 kg of 85% phosphoric acid was added with stirring and heated to 30° C., and then a sodium hydroxide solution was added to adjust the pH value to 9, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 50 nm.

Example 4

3000 L of a mixed solution of lithium chloride and lithium sulfate having a lithium content of 2 mol/L was added in a 5000 L enamel reactor, the agitation was started, 230.5 kg of 85% phosphoric acid was added and heated to 50° C., and then an aqueous sodium hydroxide solution was added to the reactor to adjust the pH value to 10, and finally was subjected to solid-liquid separation and washing, giving lithium phosphate as solid.

The resulting lithium phosphate was dispersed in water, to prepare a suspension of lithium phosphate having a concentration of 0.5 mol/L. 990 L of a mixed solution of ferrous chloride and ferrous sulfate having an iron content of 1.5 mol/L was prepared from adequate amounts of ferrous chloride and ferrous sulfate, and adjusted to pH 2 with sulfuric acid. 3000 L of the previously prepared 0.5 mol/L suspension of lithium phosphate was added into a 5000 L reactor equipped with a reflux apparatus, the agitation was started, the suspension of lithium phosphate was heated to reflux, and 990 L of the 1.5 mol/L mixed solution of ferrous chloride and ferrous sulfate prepared above was slowly added under reflux with the addition time being controlled to be about 2 h, and then the reaction was continued under reflux with stirring for 5 h, and then subjected to solid-liquid separation, washing and drying, giving nano-lithium iron phosphate without water of crystallization as solid and a corresponding mother solution of lithium iron phosphate.

The resulting mother solution of lithium iron phosphate was transferred to a 5000 L reactor for lithium recovery, 115.3 kg of 85% phosphoric acid was added with stirring and heated to 60° C., and then a sodium hydroxide solution was added to adjust the pH value to 10, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 185 nm.

Example 5

3000 L of a mixed solution of lithium carbonate and lithium nitrate having a lithium content of 1 mol/L was added in a 5000 L enamel reactor, the agitation was started, 115.3 kg of 85% phosphoric acid was added and heated to 60° C., and then an aqueous sodium hydroxide solution was added to the reactor to adjust the pH value to 10, and finally was subjected to solid-liquid separation and washing, giving lithium phosphate as solid.

The resulting lithium phosphate was dispersed in water, to prepare a suspension of lithium phosphate having a concentration of 0.25 mol/L. 735 L of a ferrous nitrate solution having an iron content of 1 mol/L was prepared from an adequate amount of ferrous nitrate, and adjusted to pH 2 with acetic acid. 3000 L of the previously prepared 0.25 mol/L suspension of lithium phosphate was added into a 5000 L reactor equipped with a reflux apparatus, the agitation was started, the suspension of lithium phosphate was heated to reflux, and 735 L of the 1 mol/L ferrous nitrate solution prepared above was slowly added under reflux with the addition time being controlled to be about 2 h, and then the reaction was continued under reflux with stirring for 6 h, and then subjected to solid-liquid separation, washing and drying, giving nano-lithium iron phosphate without water of crystallization as solid and a corresponding mother solution of lithium iron phosphate.

The resulting mother solution of lithium iron phosphate was transferred to a 5000 L reactor for lithium recovery, 57.7 kg of 85% phosphoric acid was added with stirring and heated to 70° C., and then a sodium hydroxide solution was added to adjust the pH value to 10, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 280 nm.

Example 6

3000 L of a mixed solution of lithium acetate and lithium citrate having a lithium content of 3 mol/L was added in a 5000 L enamel reactor, the agitation was started, 345.8 kg of 85% phosphoric acid was added and heated to 40° C., and then an aqueous sodium hydroxide solution was added to the reactor to adjust the pH value to 9, and finally was subjected to solid-liquid separation and washing, giving lithium phosphate as solid.

The resulting lithium phosphate was dispersed in water, to prepare a suspension of lithium phosphate having a concentration of 0.75 mol/L. 750 L of a ferrous acetate having an iron content of 3 mol/L was prepared from an adequate amount of ferrous acetate, and adjusted to pH 3 with citric acid. 3000 L of the previously prepared 0.75 mol/L suspension of lithium phosphate was added into a 5000 L reactor equipped with a reflux apparatus, the agitation was started, the suspension of lithium phosphate was heated to reflux, and 750 L of the 3 mol/L mixed solution of ferrous chloride and ferrous sulfate prepared above was slowly added under reflux with the addition time being controlled to be about 3 h, and then the reaction was continued under reflux with stirring for 4 h, and then subjected to solid-liquid separation, washing and drying, giving nano-lithium iron phosphate without water of crystallization as solid and a corresponding mother solution of lithium iron phosphate.

The resulting mother solution of lithium iron phosphate was transferred to a 5000 L reactor for lithium recovery, 172.9 kg of 85% phosphoric acid was added with stirring and heated to 50° C., and then a sodium hydroxide solution was added to adjust the pH value to 9, and finally was subjected to solid-liquid separation and washing, giving recovered lithium phosphate, which is recycled back to the process of preparing the suspension of lithium phosphate.

The $d_{50}$ of the prepared nano-lithium iron phosphate without water of crystallization is 80 nm.

The preparation process has mild reaction conditions, a short time, low energy consumption, reduced costs due to the recovery and recycling of lithium in the mother solution, good product performance, stable batches, uniform and controllable strength, and is conducive to industrial production.

What is claimed is:

1. A method for synthesizing nano-lithium iron phosphate without water of crystallization in aqueous phase at normal pressure, characterized by comprising the steps of:
    a. preparing lithium phosphate: phosphoric acid is added in an aqueous solution of a lithium salt having a lithium content of 0.2-4 mol/L and heated to 30-80° C., with the molar amount of phosphoric acid added being 1/3 of that of lithium in the solution, and then adjusted to a pH of 9-11 by adding an aqueous sodium hydroxide solution while stirring, and further subjected to solid-liquid separation and washing, giving lithium phosphate as solid;
    b. preparing an aqueous phase suspension of lithium phosphate: the resulting lithium phosphate is dispersed in water into a suspension of lithium phosphate having a lithium phosphate concentration of 0.1-1 mol/L;
    c. preparing a ferrous salt solution: a ferrous salt is dissolved into water to prepare a ferrous salt solution having an iron content of 0.5-3 mol/L, and adjusted to a pH of 1-3 with an acid;

d. preparing nano-lithium iron phosphate without water of crystallization: the suspension of lithium phosphate prepared in b is placed in a reactor and heated to boiling at normal pressure while stirring, vaporized steam is cooled and refluxed and under reflux, the ferrous salt solution prepared in c is slowly added, with the molar amount of the ferrous salt added being 0.97-1.0 time of that of lithium phosphate in the reactor and the addition time being controlled to be within 1-3 h, and after the addition, the reaction is continued under reflux with stirring for 2-8 h and then subjected to solid-liquid separation, washing and drying, giving nano-lithium iron phosphate without water of crystallization as solid and a corresponding mother solution of lithium iron phosphate;

e. recovering and recycling lithium in a mother solution of lithium iron phosphate: the remaining mother solution of lithium iron phosphate after separating nano-lithium iron phosphate without water of crystallization as solid prepared in the previous step is transferred into a reactor, phosphoric acid is added while stirring, with the molar amount of phosphoric acid added being 1/3 of that of lithium in the mother solution, and then heated to 30-80° C., and adjusted to a pH of 9-11 by adding a sodium hydroxide solution, and further subjected to solid-liquid separation and washing, giving lithium phosphate, which is recycled back to the step b.

2. The method for synthesizing nano-lithium iron phosphate without water of crystallization in aqueous phase at normal pressure of claim 1, characterized in that the lithium salt in the step a is any one of lithium sulfate, lithium carbonate, lithium chloride, lithium hydroxide, lithium nitrate, lithium acetate and lithium citrate, or a mixture thereof in any ratio.

3. The method for synthesizing nano-lithium iron phosphate without water of crystallization in aqueous phase at normal pressure of claim 1, characterized in that the ferrous salt in the step c is any one of ferrous sulfate, ferrous chloride, ferrous nitrate and ferrous acetate, or a mixture thereof in any ratio, and the acid used to adjust the pH of the solution is any one of sulfuric acid, hydrochloric acid, nitric acid, acetic acid and citric acid, or a mixture thereof in any ratio.

4. The method for synthesizing nano-lithium iron phosphate without water of crystallization in aqueous phase at normal pressure of claim 1, characterized in that the solid-liquid separation and washing in the step d is any one of suction filtration, press filtration and centrifugation, and the drying is any one of spray drying and oven drying, wherein the temperature for spray drying is 120-320° C., and the temperature for oven drying is 40-200° C. and the duration for oven drying is 0.5-48 h.

* * * * *